(12) United States Patent
Drobietz et al.

(10) Patent No.: US 10,408,194 B2
(45) Date of Patent: Sep. 10, 2019

(54) ACOUSTIC DAMPING SYSTEM FOR A WIND TURBINE TOWER

(71) Applicant: General Electric Company, Schenectady, NY (US)

(72) Inventors: Roger Drobietz, Rheine (DE); Hans-Gerd Runde, Lathen (DE); Martin Duettmann, Wippingen (DE); Andreas Petersen, Rheine (DE); Markus Koschinsky, Rheine (DE); Bernd Klaas, Meppen (DE)

(73) Assignee: General Electric Company, Schenectady, NY (US)

( * ) Notice: Subject to any disclaimer, the term of this patent is extended or adjusted under 35 U.S.C. 154(b) by 577 days.

(21) Appl. No.: 15/052,993

(22) Filed: Feb. 25, 2016

(65) Prior Publication Data

US 2017/0248127 A1  Aug. 31, 2017

(51) Int. Cl.
  *F03D 80/80*  (2016.01)
  *F03D 13/20*  (2016.01)
(52) U.S. Cl.
  CPC .............. *F03D 80/88* (2016.05); *F03D 13/20* (2016.05); *F05B 2230/60* (2013.01); *F05B 2260/964* (2013.01)
(58) Field of Classification Search
  CPC ........ F03D 7/0296; F03D 80/88; F03D 13/20; F05B 2230/60; F05B 2260/964
  See application file for complete search history.

(56) References Cited

U.S. PATENT DOCUMENTS

| 6,213,721 | B1* | 4/2001 | Watkinson | G10K 11/168 416/244 A |
| 6,672,837 | B1* | 1/2004 | Veldkamp | F16F 7/10 416/144 |
| 8,167,556 | B2* | 5/2012 | Bjerge | F03D 7/0272 416/35 |
| 8,471,396 | B2* | 6/2013 | Roddier | B63B 35/44 290/44 |
| 8,878,377 | B2* | 11/2014 | Ollgaard | F03D 11/04 290/44 |
| 2011/0150631 | A1 | 6/2011 | Choi et al. | |
| 2013/0195653 | A1 | 8/2013 | Hayashi et al. | |
| 2013/0280064 | A1 | 10/2013 | van Steinvoren | |

* cited by examiner

*Primary Examiner* — Jason D Shanske
*Assistant Examiner* — Eric J Zamora Alvarez
(74) *Attorney, Agent, or Firm* — Dority & Manning, P.A.

(57) ABSTRACT

A system and method for reducing audible tonality of a wind turbine caused by vibrations generated by the drivetrain assembly thereof includes a plurality of damping elements mounted at a plurality of locations on an inner surface of a tower of the wind turbine. The plurality of locations have vibration levels above a predetermined threshold. Thus, during operation of the wind turbine, the damping elements are configured to damp vibrations of the tower so as to reduce noise generated thereby.

15 Claims, 8 Drawing Sheets

ACOUSTIC DAMPING SYSTEM FOR A WIND TURBINE TOWER

FIELD OF THE INVENTION

The present invention relates to generally to wind turbines, and more particularly, to a system and method for reducing audible tonality generated by a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Like most dynamic systems, wind turbines are subject to undesirable vibrations that may detrimentally impact the operation and/or structural integrity of the wind turbine. In addition, such vibrations may contribute to undesirable noise in the area surrounding the wind turbine. For example, vibrations generated by the drivetrain can be radiated as sound by the tower structure, thereby significantly contributing to an audible tonality in the vicinity of the wind turbine. This noise can be a nuisance to neighbors of the wind turbine as well as personnel working at the wind turbine site.

One design approach for minimizing vibrations in the wind turbine tower is to structurally reinforce the wind turbine so as to alter its vibration response (e.g., make the tower stiffer). Such a solution, however, may be prohibitively expensive, especially as tower heights continue to increase.

In view of the aforementioned, there is a need for an improved acoustic damping system for wind turbine towers. Accordingly, the present disclosure is directed to a system and method having a plurality of damping elements that reduce audible tonality generated by the wind turbine by reducing surface vibrations of the tower.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for reducing audible tonality generated by a wind turbine. The method includes determining one or more locations on an inner surface of a tower of the wind turbine having vibration levels above a predetermined threshold. The method also includes mounting a damping element at each location above the threshold on the inner surface of the upper section of the tower of the wind turbine. Thus, during operation of the wind turbine, the damping elements are configured to damp vibrations of the tower so as to reduce audible tonality generated thereby. It should be understood that the damping elements may further include any of the additional features as described herein.

In one embodiment, the one or more locations may include an upper section of the inner surface of the tower. More specifically, in certain embodiments, the upper section of the tower may include from about 15% to about 40% of an overall height of the tower as measured from a top of the tower.

In another embodiment, the step of determining one or more locations on the inner surface of the tower of the wind turbine having vibration levels above a predetermined threshold may include measuring vibration levels at the one or more locations or determining, via computer simulation, the one or more locations as a function of at least one of a size or a location of the tower.

In another embodiment, the method may include selecting a modal mass of the mass element and a stiffness of the elastomeric element so as to set a target frequency of the damping element. In additional embodiments, the method may include omitting damping elements in locations containing flanges.

In further embodiments, the method may include spacing the plurality of damping elements evenly apart in a circumferential direction. In addition, the method may include spacing the plurality of damping elements in a vertical direction as a function of vibration levels on the inner surface of the tower.

In alternative embodiments, the method may include spacing the plurality of damping elements randomly on the inner surface of the tower.

In another aspect, the present disclosure is directed to a method for reducing audible tonality generated by a wind turbine. The method includes determining a vibration area on a tower of the wind turbine having vibration levels above a predetermined threshold. The method also includes mounting a plurality of damping elements within the vibration area of the tower of the wind turbine at or near antinode locations. Thus, during operation of the wind turbine, the damping elements are configured to damp vibrations of the tower so as to reduce audible tonality generated thereby.

In yet another aspect, the present disclosure is directed to a system for reducing audible tonality generated by a wind turbine. The system includes a plurality of damping elements mounted at a plurality of locations on an inner surface of a tower of the wind turbine, the plurality of locations having vibration levels above a predetermined threshold. Thus, during operation of the wind turbine, the plurality of damping elements are configured to damp vibrations of the tower so as to reduce audible tonality generated thereby.

In one embodiment, the vibrations of the tower (i.e. the surface vibrations) may be caused by a drivetrain assembly of the wind turbine. In such embodiments, the plurality of damping elements may be mounted on an upper section of the inner surface of the tower. More specifically, in certain embodiments, the upper section of the tower may include from about 15% to about 40% of an overall height of the tower as measured from a top of the tower. In other embodiments, the plurality of damping elements may be distributed over the entire tower surface.

In another embodiment, the plurality of damping elements are tuned-mass dampers. More specifically, in certain embodiments, each of the plurality of damping elements may include a mass element configured with an elastomeric element. Thus, in certain embodiments, the modal mass of the mass element and the stiffness of the elastomeric element may be selected to set the target frequency of the damping element.

In additional embodiments, the plurality of damping elements may be mounted on the inner surface of the tower via at least one of a magnet, one or more fasteners, or an adhesive. In embodiments utilizing magnets, the mass element, the elastomeric element, and the magnet may be secured together via a fastener through a central longitudinal axis.

In another embodiment, the plurality of damping elements may be spaced evenly apart in the circumferential or the horizontal direction. Further, spacing of the plurality of damping elements in the vertical direction may be determined as a function of vibration levels on the inner surface of the tower, e.g. as determined via simulation. Alternatively, the plurality of damping elements may be randomly spaced on the inner surface of the tower.

In still a further embodiment, the plurality of damping elements may have a frequency range of from about 80 Hertz (Hz) to about 800 Hz although it should be understood that any suitable broad frequency range may be selected so as to cover large parts of the wind turbine variable speed operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
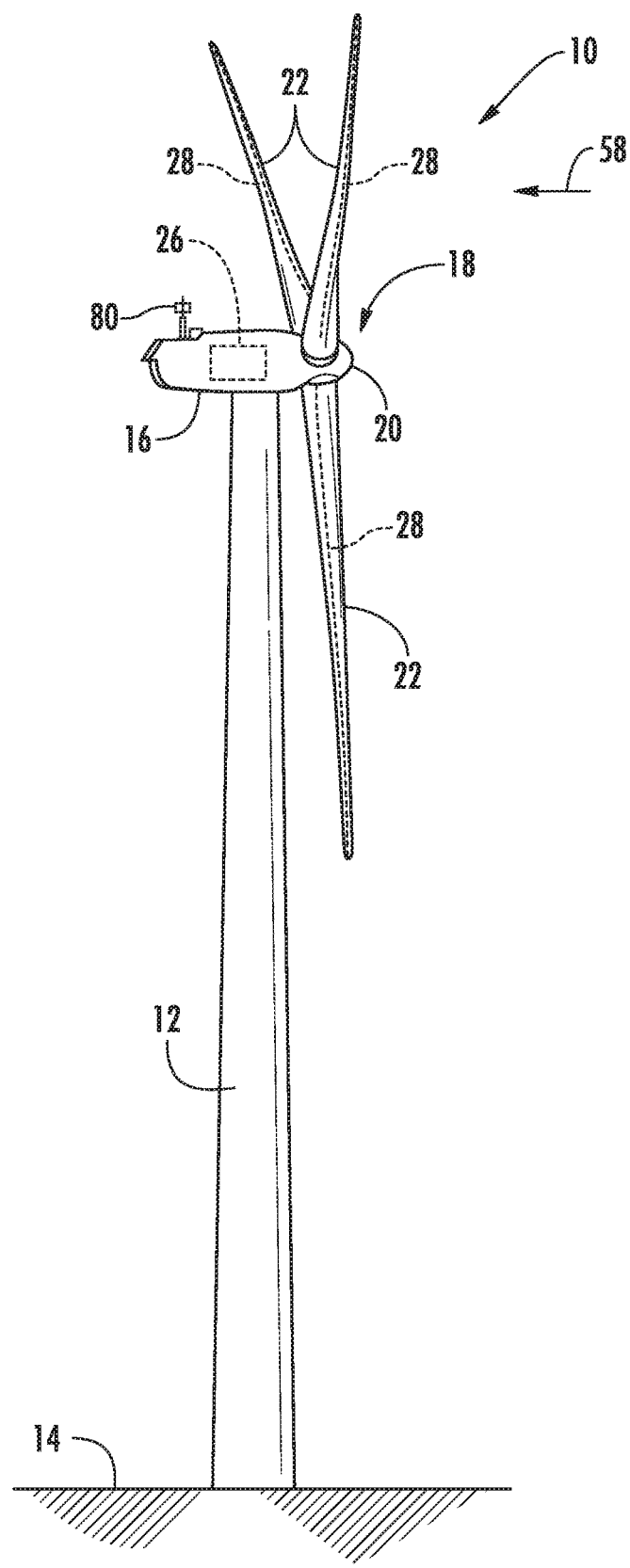
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for reducing audible tonality of a wind turbine caused by vibrations generated by the drivetrain assembly thereof. The system includes a plurality of damping elements mounted at a plurality of locations on an inner surface of a tower of the wind turbine, the plurality of locations having vibration levels above a predetermined threshold. Thus, during operation of the wind turbine, the plurality of damping elements are configured to damp vibrations of the tower so noise generated thereby.

The present disclosure provides many advantages not present in the prior art. For example, the damping system according to the present disclosure can be easily retro-fit to existing wind turbines. Further, the damping system of the present disclosure provides a cost-effective solution for improving acoustic efficiency of the turbine. Thus, by reducing tower vibrations, the damping system of the present disclosure reduces noise in the vicinity of the wind turbine. In addition, the damping system of the present disclosure covers a wide frequency range and thus works robustly over its lifetime without the need for additional maintenance and/or tuning.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
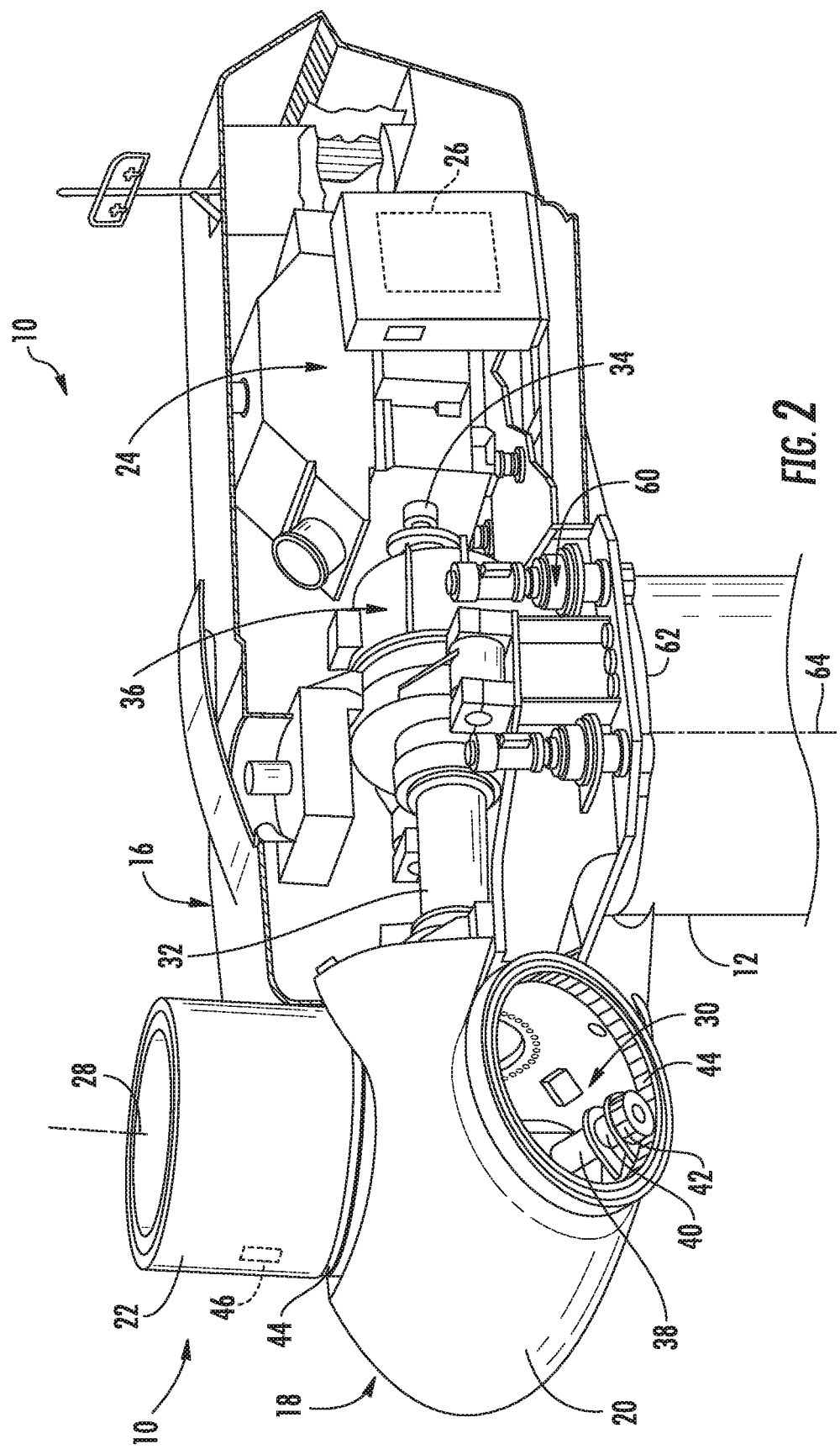
FIG. 2 illustrates a detailed, perspective view of one embodiment of a nacelle of a wind turbine according to the present disclosure.

The wind turbine 10 may also include a turbine control system or turbine controller 26 centralized within the nacelle 16. In general, the turbine controller 26 may include a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. In addition, the turbine controller 26 may control the orientation of the nacelle 16 with respect to the wind direction 58 by transmitting suitable control signals to one or more yaw drive mechanisms 60 that engage a yaw bearing 62 (FIG. 2). Thus, rotation of the yaw bearing 62 changes the orientation of the nacelle 16.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28. In alternative embodiments, it should be appreciated that each pitch adjustment mechanism 30 may have any other suitable configuration that facilitates rotation of a rotor blade 22 about its pitch axis 28.

During operation of the wind turbine 10, the drivetrain assembly (i.e. the generator 24, the gearbox 36, and the corresponding shafts 32, 34) cause vibrations that are generated as sound throughout the nacelle 16 and the tower 12, particularly the upper portion of the tower 12. Such vibrations contribute significantly to an audible tonality in the vicinity of the turbine 10. More specifically, the drivetrain assembly may cause tower surface vibrations that generate noise that can be a nuisance to neighbors of the wind turbine 10. Thus, FIG. 3 and illustrate schematic diagrams of various embodiments of a system 100 for reducing audible tonality near a wind turbine (e.g. the tower 12 of wind turbine 10) that addresses the aforementioned issues.

As shown in the illustrated embodiments, the system 100 includes a plurality of damping elements 102 mounted on an inner surface 104 of the tower 12 of the wind turbine 10. More specifically, in certain embodiments, the plurality of damping elements 102 may be mounted on an upper section 106 of the inner surface 104 of the tower 12, however, it should be understood that the damping elements 102 may also be mounted at any other suitable location within the tower 12. Further, the damping elements 102 may be mounted at a plurality of locations on the inner surface 104 of the tower 12, where vibration levels are above a predetermined threshold.

Figure 4:
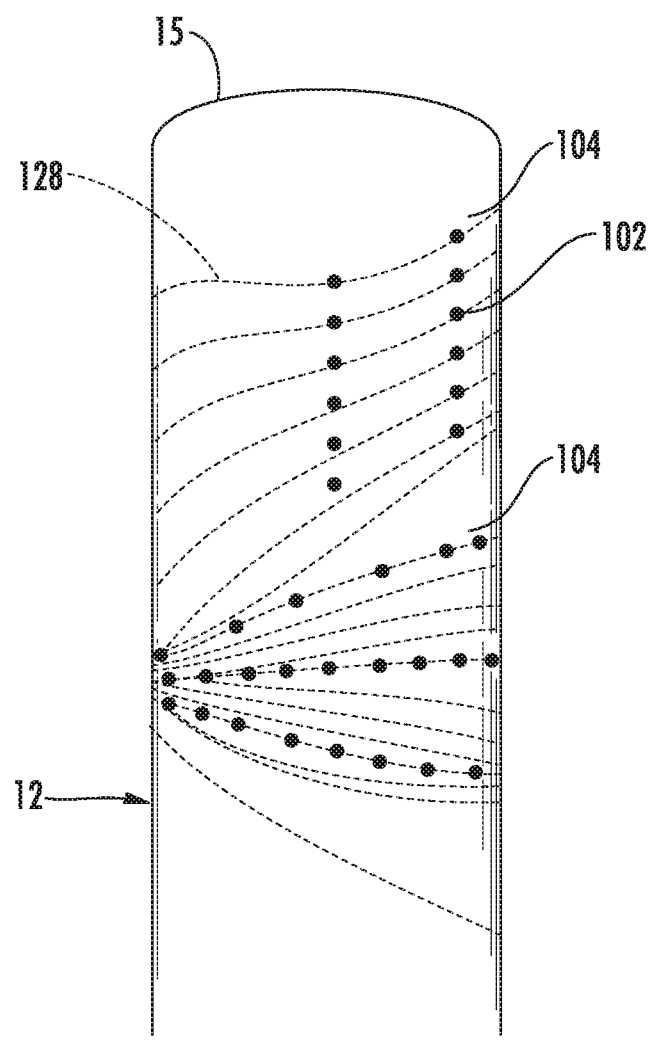
FIG. 4 illustrates a schematic diagram of another embodiment of a system for reducing audible tonality generated by a wind turbine according to the present disclosure.

For example, in certain embodiments, the damping elements 102 may be mounted at critical tower areas as determined by measuring vibrations or through modeling, e.g. Finite Element Method (FEM)/Boundary Element Method (BEM) simulation or similar. More specifically, as shown in FIG. 4, the damping elements 102 may be located within a vibration area 128 having vibration levels above the predetermined threshold. For example, as shown, a vibration typically has a shape having vibration nodes (i.e. where the vibration amplitude is zero) and vibration antinodes (i.e. where the vibration amplitude is maximal). As such, the damping elements 102 can be mounted at or near the antinode location(s). In certain embodiments, there may not be unique antinode locations, i.e. because a location that is in the antinode of one vibration type at one frequency may be not the antinode location for another vibration type at another frequency. Thus, by mounting the damping elements 102 across critical areas of the tower, at least a portion of the damping elements 102 will always be outside the nodes of the various vibration types.

In further embodiments, single point critical areas of the tower 12 having the strongest vibration antinodes/highest vibration amplitudes may be determined (using simulations and/or measurements) and the damping elements 102 can be located at such points. As such, the present disclosure provides a system and method for damping vibrations where distinct vibration types with distinct antinodes can be determined as well as in cases where distinct antinode areas cannot be determined (i.e. due to multiple vibration types).

Further, the upper section 106 of the tower 12 generally refers to the upper portion of the tower 12 closest to the nacelle 16 and therefore the portion typically most impacted by the drivetrain-induced vibrations. Thus, in certain embodiments, the upper section 106 of the tower 12 generally encompasses from about 15% to about 40% of an overall height of the tower 12 as measured from the top 15 of the tower 12. Accordingly, during operation of the wind turbine 10, the plurality of damping elements 102 are configured to damp vibrations of the upper section 106 of tower 12 so as to reduce audible tonality near the wind turbine 10.

Figure 5:
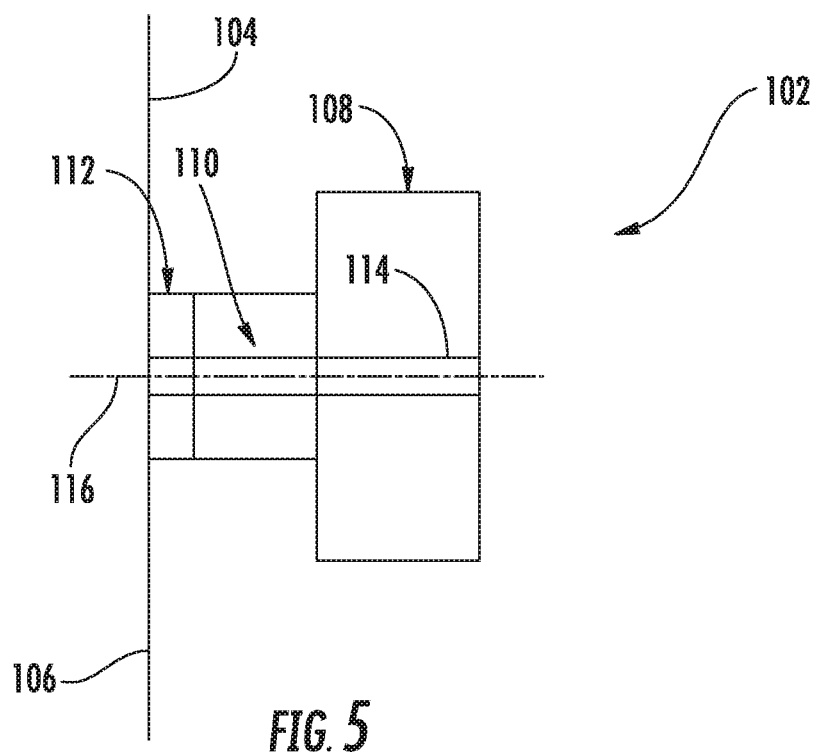
FIG. 5 illustrates a side view of one embodiment of a damping element of the system of FIG. 3 according to the present disclosure.
Figure 6:
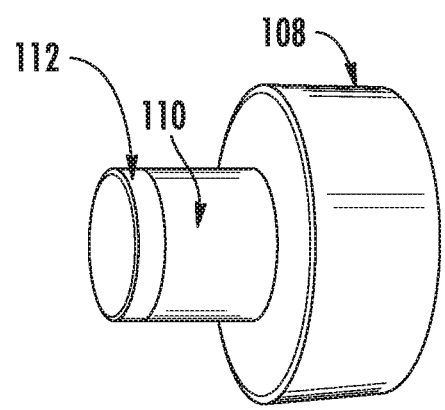
FIG. 6 illustrates a perspective view of one embodiment of a damping element of the system of FIG. 3 according to the present disclosure.

Referring now to FIGS. 5 and 6, the damping elements 102 may be tuned-mass dampers. As used herein, a tuned-mass damper generally refers to a damping device mounted to structures to reduce the amplitude of mechanical vibrations. Thus, tuned mass dampers are configured to stabilize against violent motion caused by harmonic vibration. More specifically, as shown in the illustrated embodiment, each of the damping elements 102 may include a cylindrical mass element 108 configured or mounted with a cylindrical elastomeric element 110. In certain embodiments, the mass element 108 is selected such that its modal mass is less than from about 1% to about 5% of the modal mass of the tower 12, more preferably less than about 2% of the modal mass of the tower 12. In particular embodiments, 2% of the modal mass of the tower 12 corresponds to the total number of damping elements 102, e.g. about 1000, with each element weighing from about one (1) to about two (2) kilograms. Further, the mass element 108 may be constructed of any suitable material, including but not limited to a metal (e.g. steel) or a metal alloy.

In addition, the elastomeric element 110 may be constructed of any suitable elastomer material, including but not limited to rubber, silicone, or similar. Thus, the elastomeric element 110 is generally designed in terms of stiffness and damping constants. As such, the modal mass of the mass element 108 and the stiffness of the elastomeric element 110 may set the target frequency of the damping element 102. In certain embodiments, the damping ratio of the damping elements 102 is targeted to be from about 1% to about 25%. Thus, in certain embodiments, the plurality of damping elements 102 may have a frequency range of from about 80 Hertz (Hz) to about 800 Hz, which corresponds to the audible frequency range of typical steel towers, although it should be understood that any suitable frequency range may be selected so as to cover large parts of the wind turbine variable speed operation as well as multiple types of towers. More specifically, the tower 12 may have a specific type of vibration/vibration shape, which is critical with regard to tonality, although typical towers can have multiple critical vibration shapes at different frequencies. Thus, the damping elements 102 of the present disclosure can be tuned to a specific frequency, with its effectiveness broad enough to cover and counteract multiple vibration types at different frequencies.

It should be understood that any number of damping elements 102 may be utilized in the system 100. For example, from one (1) to more than five hundred (500) damping elements 102 may be utilized in the system 100. In additional embodiments, more than five hundred (500) damping elements 102 may be utilized in the system 100. With the size of the damping elements 102, the overall system 100 still minimizes additional weight added to the turbine 10 during operation. For example, for embodiments described herein, the system 100 adds less than 1.5 tons to the overall mass of the wind turbine 10.

Figure 7:
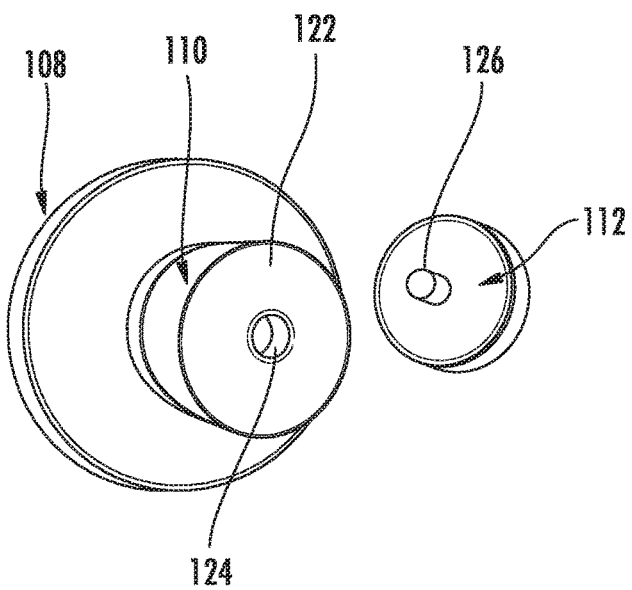
FIG. 7 illustrates a perspective view of one embodiment of the various components of a damping element of the system of FIG. 3 according to the present disclosure.

In additional embodiments, the damping elements 102 may be mounted on the inner surface 104 of the tower 12 via at least one of a magnet 112, one or more fasteners (e.g. screws, bolts, etc.), and/or an adhesive (e.g. glue, tape, or similar). In additional embodiments, the magnet 112 may include any suitable magnet, including e.g. a neodymium standard element. In embodiments that utilize magnets, as shown in FIG. 5, the components of the damping element 102, i.e. the mass element 108, the elastomeric element 110, and the magnet 112, may be secured together via one or more fasteners 114 or screws configured through a central longitudinal axis 116. For example, in one embodiment as shown in FIG. 7, the elastomeric element 110 may have a metal plate 122 configured at the tower-facing end thereof that contains a threaded hole 124. As such, the magnet 112 may have a corresponding fastener head 126 configured to fit within the threaded hole 124 so as to secure the components together.

Figure 3:
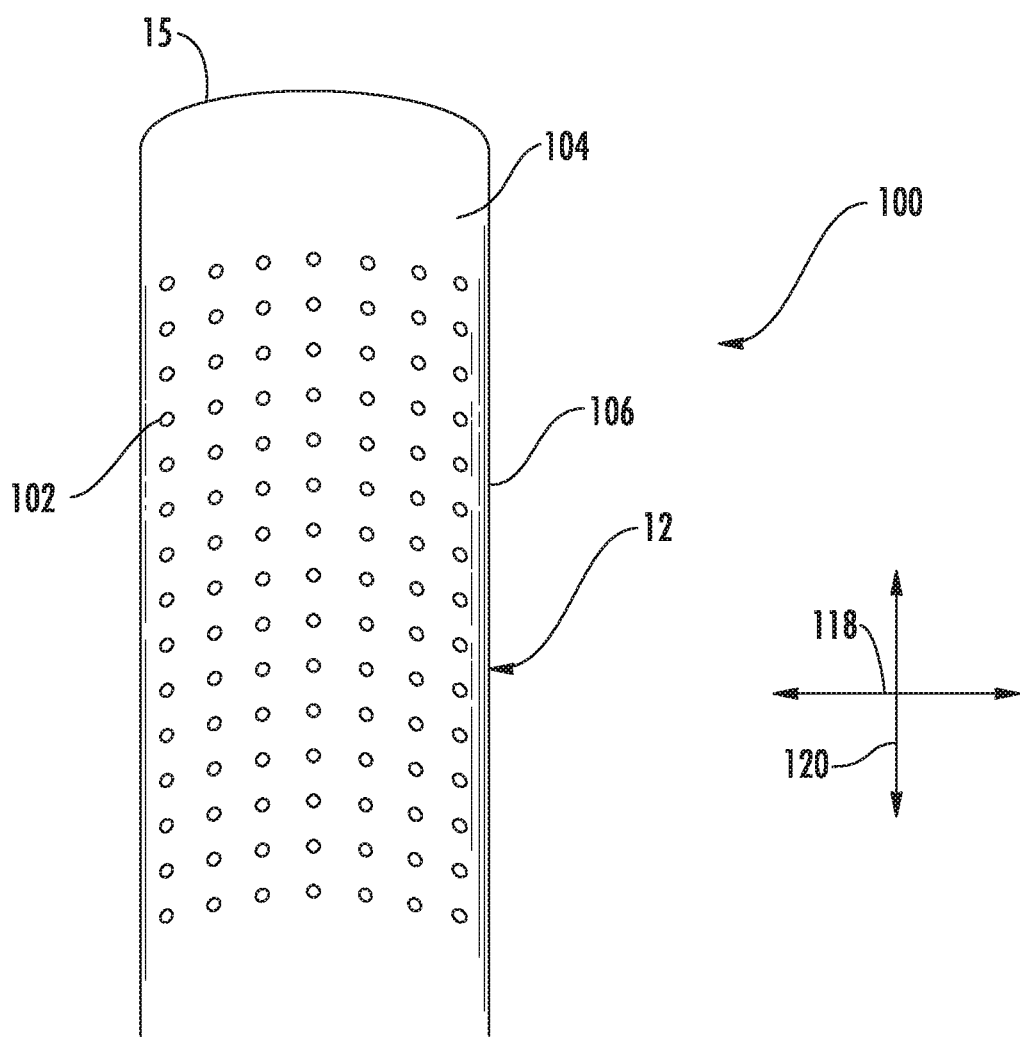
FIG. 3 illustrates a schematic diagram of one embodiment of a system for reducing audible tonality generated by a wind turbine according to the present disclosure.
Figure 8:
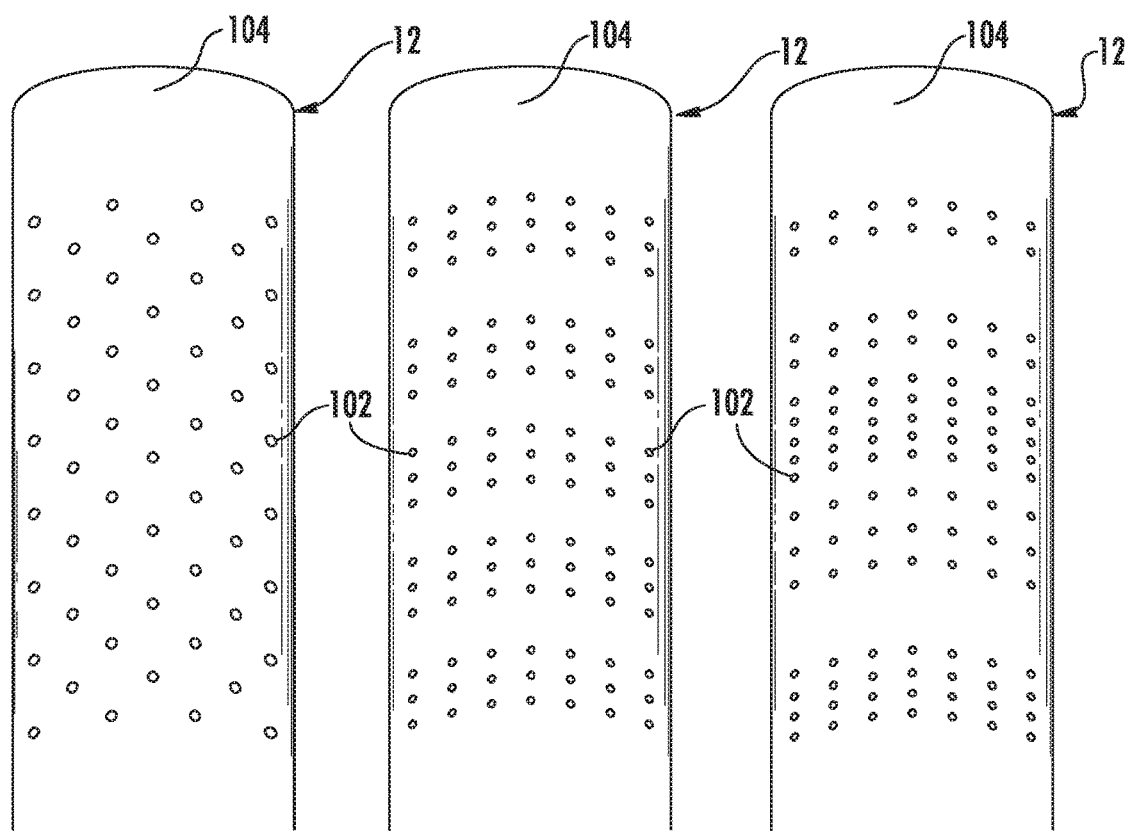
FIG. 8 illustrates a schematic diagram of various embodiments of systems for reducing audible tonality generated by a wind turbine tower according to the present disclosure, particularly illustrating different configurations of the damping elements arranged on an inner surface of the tower of the wind turbine.

Referring to FIGS. 3 and 8, the damping elements 102 may be spaced in any suitable pattern on the inner surface 104 of the tower 12. For example, as shown in FIG. 3, the damping elements 102 are spaced evenly apart in both the circumferential (or horizontal) direction 118 and the vertical direction 120. Further, as shown in FIG. 8, spacing of the damping elements 102 in the vertical direction 120 may be determined as a function of vibration levels on the inner surface 104 of the tower 12. Thus, as shown, the damping elements 102 may be evenly or randomly spaced in the vertical direction 120. Alternatively, the plurality of damping elements 102 may be randomly spaced in both the horizontal and vertical directions 118, 120 on the inner surface 104 of the tower 12. In addition, as shown, the damping elements 102 may be arranged together in groups. After placement of the damping elements 102, computer simulation and/or sensor measurements may be run once again on the tower 12 to determine the effectiveness of the damping elements 102.

Figure 9:
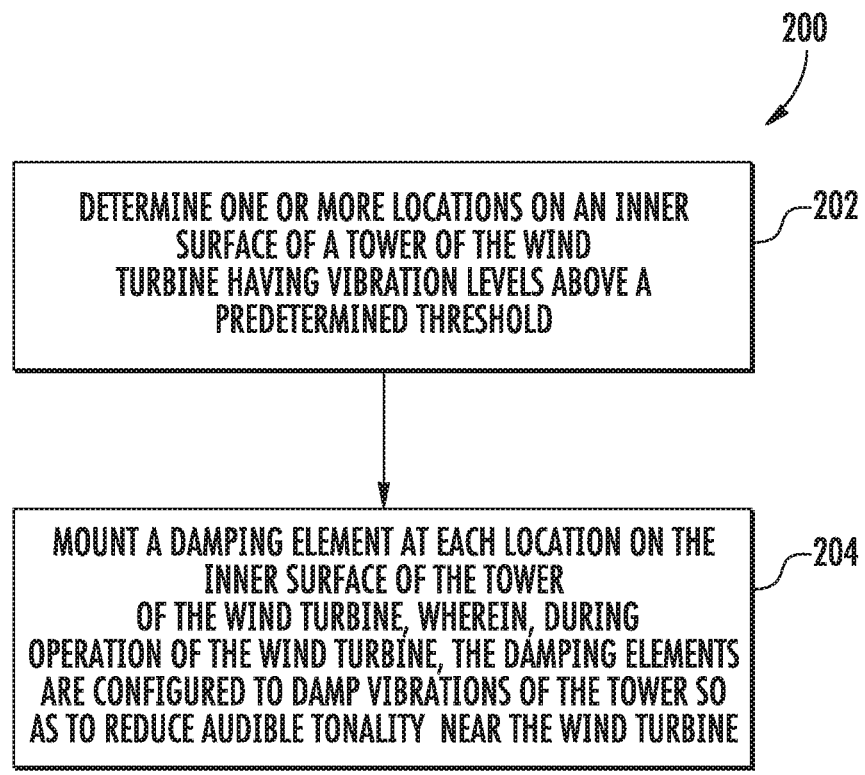
FIG. 9 illustrates a flow diagram of one embodiment of a method for reducing audible tonality generated by a wind turbine according to the present disclosure.

Referring now to FIG. 9, a flow diagram of one embodiment of a method 200 for reducing audible tonality generated by a drivetrain assembly of a wind turbine 10 is illustrated. As shown at 202, the method 200 includes determining one or more locations on an inner surface 104 of the tower 12 of the wind turbine 10 having vibration levels above a predetermined threshold, e.g. above a critical level that causes undesirable noise levels to neighboring properties of the wind turbine 10. As shown at 204, the method 200 includes mounting a damping element 102 at each of the locations on the inner surface 104 of the tower 12 of the wind turbine 10 having a high vibration level. Thus, during operation of the wind turbine 10, the damping elements 102 are configured to damp vibrations of the tower 12 so as to reduce audible tonality generated by the drivetrain assembly.

In one embodiment, the step of determining one or more locations on the inner surface 104 of the tower 12 of the wind turbine 10 having vibration levels above a predetermined threshold may include measuring vibration levels at the one or more locations or determining, via computer simulation, the location(s) as a function of at least one of the tower size/shape of the tower 12 and/or location of the tower 12. More specifically, the locations may be determined using FEM/BEM simulation.

In another embodiment, the method 200 may include selecting the modal mass of the mass element and the stiffness of the elastomeric element so as to set a target frequency of the damping element 102.

Further, the method 200 may include omitting damping elements 102 in locations containing flanges. In additional embodiments, the method 200 may include spacing the plurality of damping elements 102 evenly apart in the circumferential direction 118. Moreover, the method 200 may include spacing the plurality of damping elements 102 in a vertical direction 120 as a function of vibration levels on the inner surface 104 of the tower 12, e.g. via simulation.

In alternative embodiments, the method 200 may include spacing the damping elements 102 randomly on the inner surface 104 of the tower 12.

Figure 10:
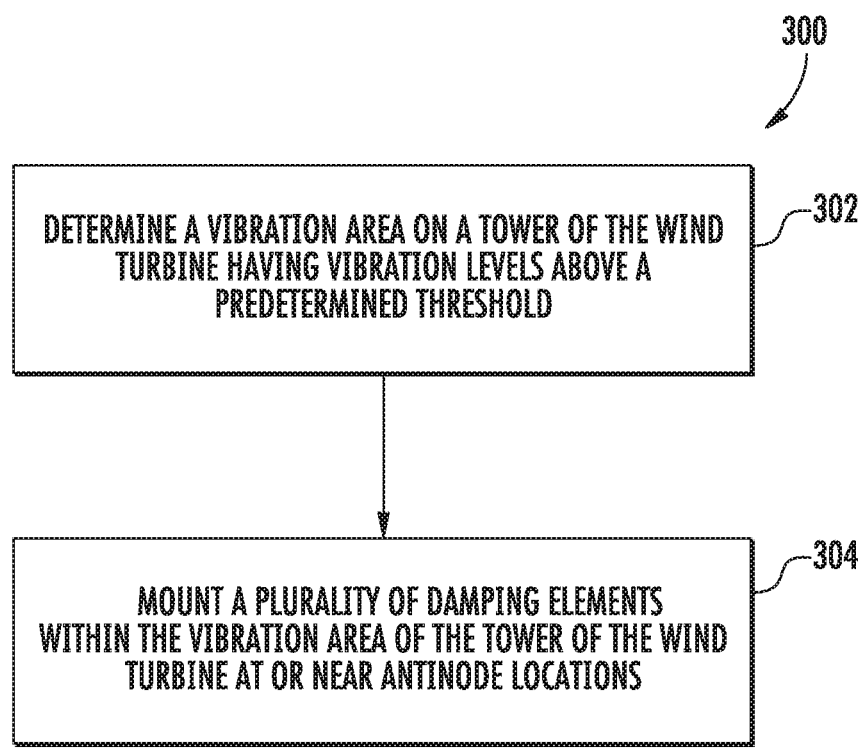
FIG. 10 illustrates a flow diagram of one embodiment of a method for reducing audible tonality generated by a wind turbine according to the present disclosure.

Referring now to FIG. 10, a flow diagram of one embodiment of a method 300 for reducing audible tonality generated by a drivetrain assembly of a wind turbine 10 is illustrated. As shown at 302, the method 300 includes determining a vibration area 128 on a tower 12 of the wind turbine 10 having vibration levels above a predetermined threshold. As shown at 304, the method 300 also includes mounting a plurality of damping elements 102 within the vibration area 102 of the tower of the wind turbine at or near antinode locations. Thus, during operation of the wind turbine 10, the damping elements 102 are configured to damp vibrations of the tower 12 so as to reduce audible tonality generated thereby.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing audible tonality generated by a wind turbine, the method comprising:
   determining a plurality of locations on an inner surface of a tower of the wind turbine having vibration levels above a predetermined threshold;
   providing a plurality of tuned-mass dampers, each of the plurality of tuned-mass dampers having a discrete mass element, a discrete elastomeric element, and a discrete magnet secured together;
   and mounting one of the plurality of tuned-mass dampers at each location on the inner surface of the tower of the wind turbine, wherein a total modal mass of all of the discrete mass elements is less than 2% of a modal mass of the tower;
   wherein, during operation of the wind turbine, the plurality of tuned-mass dampers are configured to damp vibrations of the tower so as to reduce audible tonality generated by a drivetrain of the wind turbine.

2. The method of claim 1, wherein the plurality of locations are located on an upper section of the inner surface of the tower, wherein the upper section of the tower comprises from 15% to 40% of an overall height of the tower as measured from a top of the tower.

3. The method of claim 1, wherein determining the plurality of locations on the inner surface of the tower of the wind turbine having vibration levels above a predetermined threshold further comprises measuring vibration levels at the plurality of locations.

4. The method of claim 1, further comprising omitting tuned-mass dampers in locations containing flanges.

5. The method of claim 1, further comprising selecting the modal mass of the mass element and a stiffness of the elastomeric element so as to set a target frequency of each of the plurality of tuned-mass dampers.

6. The method of claim 1, further comprising spacing the plurality of tuned-mass dampers evenly apart in a circumferential direction.

7. The method of claim 1, further comprising spacing the plurality of tuned-mass dampers in a vertical direction as a function of vibration levels on the inner surface of the tower.

8. The method of claim 1, wherein determining the plurality of locations on the inner surface of the tower of the wind turbine having vibration levels above a predetermined threshold further comprises determining, via computer simulation, the plurality of locations as a function of at least one of a size or a location of the tower.

9. A system for reducing audible tonality generated by a wind turbine, the system comprising:
   a plurality of tuned-mass dampers, each of the plurality of tuned-mass dampers comprising a discrete mass element, a discrete elastomeric element, and a discrete magnet secured together, the plurality of tuned-mass dampers mounted at a plurality of different locations on an inner surface of the tower, the plurality of locations having vibration levels above a predetermined threshold, wherein a total modal mass of all of the discrete mass elements of the plurality of tuned-mass dampers is less than 2% of a modal mass of the tower;
   wherein, during operation of the wind turbine, the plurality of tuned-mass dampers are configured to damp vibrations of the tower so as to reduce audible tonality generated by a drivetrain of the wind turbine.

10. The system of claim 9, wherein the plurality of tuned-mass dampers are mounted on an upper section of the inner surface of the tower, wherein the upper section of the tower comprises from 15% to 40% of an overall height of the tower as measured from a top of the tower.

11. The system of claim 9, wherein the modal mass of the mass element and a stiffness of the elastomeric element set a target frequency of each of the plurality of tuned-mass dampers.

12. The system of claim 9, wherein the plurality of tuned-mass dampers are spaced evenly apart in a circumferential direction.

13. The system of claim 12, wherein spacing of the plurality of tuned-mass dampers in a vertical direction is determined as a function of vibration levels on the inner surface of the tower.

14. The system of claim 9, wherein the plurality of tuned-mass dampers are randomly spaced on the inner surface of the tower.

15. The system of claim 9, wherein the plurality of tuned-mass dampers comprise a frequency range of from about 80 Hertz (Hz) to about 800 Hz.

* * * * *